(12) United States Patent
Dotan

(10) Patent No.: US 7,363,493 B2
(45) Date of Patent: Apr. 22, 2008

(54) METHOD FOR PROTECTING COMPUTER PROGRAMS AND DATA FROM HOSTILE CODE

(75) Inventor: Eyal Dotan, Bussy St Georges (FR)

(73) Assignee: Antimalware, Ltd., Tortola (VG)

( * ) Notice: Subject to any disclaimer, the term of this patent is extended or adjusted under 35 U.S.C. 154(b) by 0 days.

(21) Appl. No.: 10/037,560

(22) Filed: Jan. 4, 2002

(65) Prior Publication Data
US 2002/0147923 A1 Oct. 10, 2002

(30) Foreign Application Priority Data
Jan. 19, 2001 (EP) ................... 01400161
May 7, 2001 (EP) ................... 01401170

(51) Int. Cl.
H04L 9/00 (2006.01)
G06F 12/14 (2006.01)

(52) U.S. Cl. ...................... 713/167; 713/188
(58) Field of Classification Search ............... 713/188, 713/200
See application file for complete search history.

(56) References Cited

U.S. PATENT DOCUMENTS

| | | | | |
|---|---|---|---|---|
| 4,962,533 A * | 10/1990 | Krueger et al. | ............... | 380/25 |
| 5,280,614 A * | 1/1994 | Munroe et al. | ............. | 718/107 |
| 5,361,359 A * | 11/1994 | Tajalli et al. | ............... | 395/700 |
| 5,408,642 A | 4/1995 | Mann | ......................... | 395/575 |
| 5,421,006 A * | 5/1995 | Jablon et al. | ............... | 395/575 |
| 5,446,903 A * | 8/1995 | Abraham et al. | ........... | 710/240 |
| 5,859,966 A * | 1/1999 | Hayman et al. | ............... | 726/23 |
| 5,937,159 A * | 8/1999 | Meyers et al. | ......... | 395/187.01 |
| 5,958,050 A * | 9/1999 | Griffin et al. | ............... | 713/200 |
| 6,125,447 A | 9/2000 | Gong | ......................... | 713/201 |
| 6,173,404 B1 * | 1/2001 | Colburn et al. | ............. | 713/200 |
| 6,199,181 B1 * | 3/2001 | Rechef et al. | ................ | 714/38 |
| 6,314,409 B2 * | 11/2001 | Schneck et al. | ............... | 726/1 |
| 6,549,521 B1 * | 4/2003 | Edwards et al. | ............ | 370/255 |
| 6,772,332 B1 * | 8/2004 | Boebert et al. | ............. | 713/153 |

(Continued)

FOREIGN PATENT DOCUMENTS

EP 0 472 487 A2 * 7/1991

(Continued)

OTHER PUBLICATIONS

Moffett et. al. Specifying discretionary Access Control Policy for Distributed systems, Computer Communication 13(9) 571-580, Nov. 1990.*

(Continued)

Primary Examiner—Nasser Moazzami
Assistant Examiner—Brandon S Hoffman
(74) Attorney, Agent, or Firm—Nixon Peabody LLP.; Joseph Bach

(57) ABSTRACT

A method that protects computer data from untrusted programs. Each computer's object and process is assigned with trust attributes, which define the way it can interact with other objects within the system. The trust attributes are defined hierarchically so that processes cannot access objects with higher trust levels than themselves. When accessing objects with lower trust levels, processes can see their trust levels lowered to that of the object accessed. The interaction between processes and objects of different levels is entirely programmable.

20 Claims, 5 Drawing Sheets

U.S. PATENT DOCUMENTS

| | | |
|---|---|---|
| 6,839,850 B1 * | 1/2005 | Campbell et al. .............. 726/23 |
| 6,871,277 B1 * | 3/2005 | Keronen ..................... 713/167 |
| 2003/0159070 A1 | 8/2003 | Mayer et al. |
| 2003/0233490 A1 | 12/2003 | Blaser et al. |
| 2005/0257265 A1 | 11/2005 | Cook et al. |

FOREIGN PATENT DOCUMENTS

| | | |
|---|---|---|
| EP | 0 472 487 A2 | 2/1992 |
| EP | 0 472 487 A3 | 2/1992 |
| GB | 2 391 650 A | 2/2004 |
| GB | 2 411 748 A | 9/2005 |
| GB | 2 411 988 A | 9/2005 |
| WO | WO 01/92981 A2 | 12/2001 |

OTHER PUBLICATIONS

Anonomous, Performing Hierarchical Authorizations, IBM Technical Disclosure Bulletin Oct. 1991.*

Anonomous, Mechanism for Trusted Computing Base Isolation, Jan. 1992, IBM TDB.*

Moffett J. et al, "Specifying Discretionary Access Control Policy for Distributed Systems," Computer Communications, NL, Elsevier Science Publishers BV, Amsterdam, vol. 13, No. 9, Nov. 1, 1990, pp. 571-580, XP000161309; ISSN: 0140-3664.

"Performing Hierarchical Authorizations," IBM Technical Disclosure Bulletin, US, IBM Corp., New York (vol. 34, No. 5) Oct. 1, 1991, pp. 31-32; XP000189658; ISSN: 0018-8689.

European Search Report EP 01 40 0161.

European Search Report EP 01 40 1170.

* cited by examiner

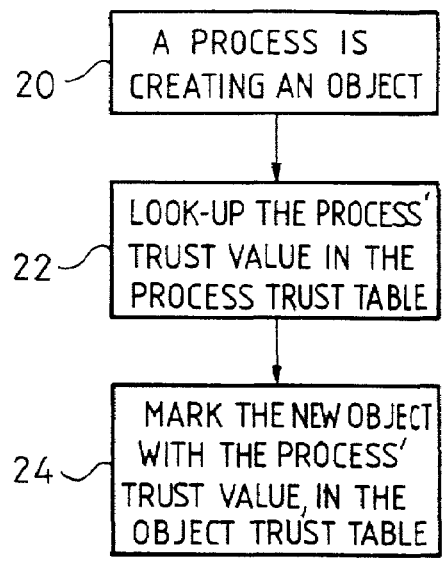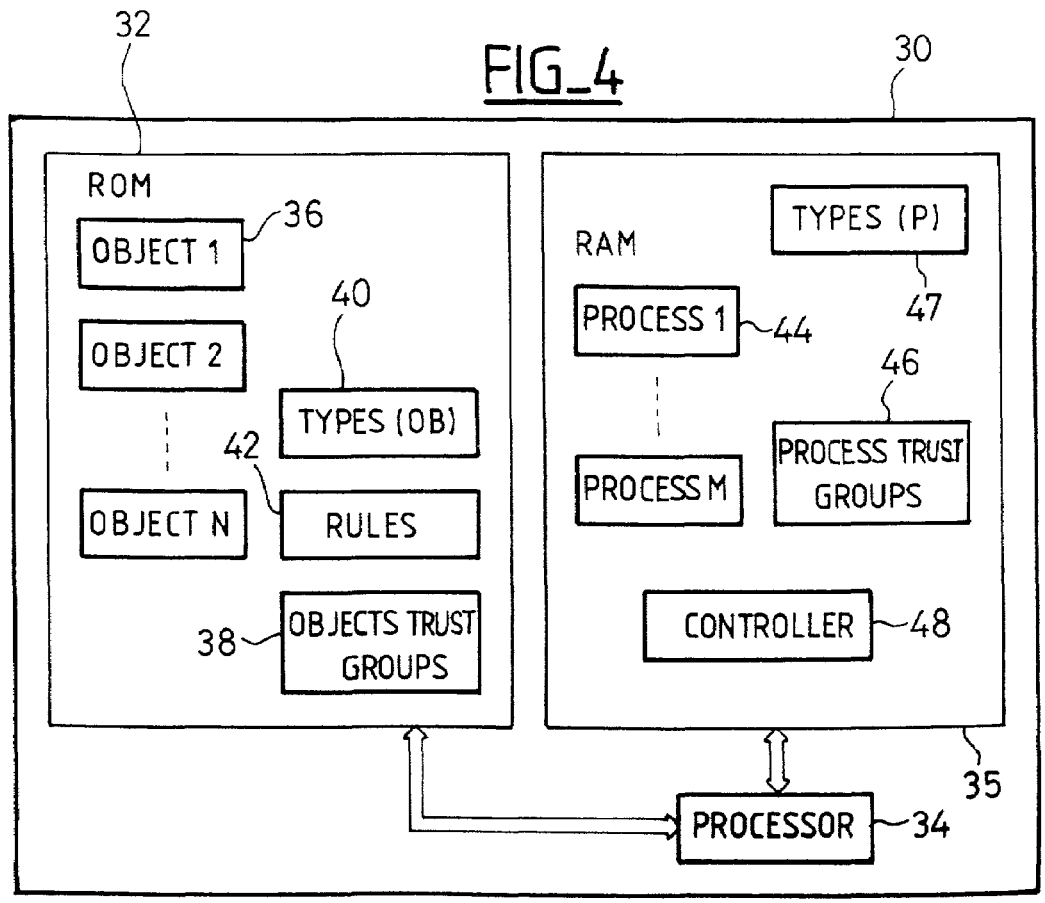

METHOD FOR PROTECTING COMPUTER PROGRAMS AND DATA FROM HOSTILE CODE

FIELD OF THE INVENTION

The invention relates to a method for protecting computer data and programs, and more generally to computer system and network security. The invention is useful for preventing data damage and theft, which can be done by malicious code attacks.

BACKGROUND

A computer in the present specification is a machine containing a processor and memory, and where the processor is able to execute instructions selected among a given set of instructions. A series of instructions for execution by the processor is called a "program" or "code." When stored in the memory of the computer, a program is referred to as "passive code." When loaded into the processor for execution, it is called a "process." Data is information that may be handled or managed in any way by a computer program; data may also be stored in the memory of the computer. A network comprises a plurality of computers connected together.

We call "malicious" or "hostile" any code designed or modified to intentionally corrupt or steal data or programs from the computer system or network on which it runs. Protecting from hostile code is a challenging problem, since there is no way to programmatically distinguish positive and negative program actions, other than knowing whether they are ultimately good for the user or not. For example, a program may delete a file because the user has explicitly asked it to, but a malicious program could also delete a file against the user's will. In other words, there is no proper technical definition of "malicious" or "hostile" code—these being defined according to the behavior expected from a computer by its legitimate user.

Although it is possible to authenticate authorized users with password, trusted users themselves may endanger the system and network's security by unknowingly running programs that contain malicious instructions such as "viruses," "Trojan horses," "malicious macros," "malicious scripts," "worms," "spying programs" and "backdoors." A computer virus is a program that replicates by attaching itself to other programs. A Trojan horse is a program that in a general way does not do what the user expects it to do, but instead performs malicious actions such as data destruction and system corruption. Macros and scripts are programs written in high-level languages, which can be interpreted and executed by applications such as word processors, in order to automate frequent tasks. Because many macro and script languages require very little or no user interaction, malicious macros and scripts are often used to introduce viruses or Trojan horses into the system without user's approval. A worm is a program that, like a virus, spreads itself. But unlike viruses, worms do not infect other host programs and instead send themselves to other users via networking means such as electronic mail. Spying programs are a subtype of Trojan horses, secretly installed on a victim computer in order to send out confidential data and passwords from that computer to the person who put them in. A backdoor is a secret functionality added to a program in order to allow its authors to crack or misuse it, or in a general way exploit the functionality for their own interest.

All of the above programs can compromise computer systems and a company's confidentiality by corrupting data, propagating from one file to another, or sending confidential data to unauthorized persons, in spite of the user's will.

Along the years, different techniques were created to protect computer systems against malicious programs:

Signature scanners detect viruses by using a pre-defined list of "known viruses." They scan each file for each virus' signatures listed in their known virus database. Each time a new virus is found anywhere in the world, it is added to that database. However, today more and more new viruses are created every day, and the known-viruses list needs to be constantly updated in order to be effective. Regularly updating an anti-virus is a heavy task for both the single-user and the network administrator and it leaves an important security gap between updates.

Another detection method, commonly called Heuristic Scanning consists of scanning programs for suspicious instructions that are typical to malicious programs and specifically viruses, without needing to have an exact signature of each virus in order to detect it in files. However, malicious program writers can avoid or hide those typical instructions by writing their code differently and/or encrypting it, and thus malicious code and viruses rapidly avoid detection by Heuristic Scanners.

U.S. Pat. No. 5,408,642 and U.S. Pat. No. 5,349,655, issued to Mann and U.S. Pat. No. 5,613,002, issued to Kephart et al., all disclose methods for recovering a computer program infected with a virus. The disclosed methods include generating fingerprint of data prior to infection by a virus and storing the fingerprint. Second fingerprint of data is then generated and compared to the prior strings of data, to determine if the data has been corrupted by a virus and for restoring the data to its initial state. These techniques do not prevent viruses from infecting, nor do they protect against other types of malicious programs.

U.S. Pat. No. 6,073,239, issued to the present inventor, discloses a method where file I/O activity is filtered. Whenever a program attempts to infect or inject code into another program file, it will be denied. The method, however, is only designed to work against executable-files viruses. It does not address other types of viruses, such as macro-viruses, nor other types of malicious programs: worms, Trojan horses, backdoors or spying software, because these malicious programs do not inject code nor modify other programs, but directly trigger malicious actions such as data corruption.

U.S. Pat. No. 5,421,006, issued to Jablon et al., discloses a method for assessing integrity of computer system software at the time of system initialization. Startup processes are verified before being allowed to execute. The method, however, does not prevent the protected processes from being corrupted in the first place, nor does it deal with data and programs other than those related to the system startup.

Other security methods consist of certifying programs that are authorized to run and blocking out all the other, unauthorized programs. Unfortunately, these techniques are not always adapted to open systems where users receive and exchange many files.

One common security system consists of establishing access control lists (i.e. ACL, DACL) that define restrictions and rights as to which users are allowed or not allowed to access certain resources, based on those users' rights. For example, system administrators are typically allowed to modify any files while simple users cannot read nor modify some confidential or critical files. Such security system is usually integrated in modern operating systems to ensure data security and confidentiality on a per-user basis. However, it is important to make a distinction and understand that this security scheme was designed to address the issue of user trust, not the issue of code trust. Users who run malicious programs within their systems will unknowingly compromise the integrity of every resource and file they're allowed to access with no further protection. For instance, let's say user X is granted full access to the shared files A, B and C. If this user runs a program infected with a virus, the virus will be able to read, infect or even destroy the files A, B and C. This is due to the fact that access control lists are designed so that programs and tasks run in the security contexts of the users who started them. Thus, even though the user has not meant to actually harm files A, B and C, the program he ran did harm these files despite of the user's will, yet according to the user's rights. This is the heart of the malicious code problem. If a user runs hostile code, the code will be able to corrupt and steal any data within the system or network to which its user has access. And if a system administrator runs hostile code, the entire system and network are immediately compromised. Additional to these security problems, access control lists are statically defined for each file and resource. In environments where files are shared and exchanged every day, this does not provide enough security against malicious code, since users usually don't take the time to assign the right security attributes for each new file they create or receive. Such systems are disclosed in EP-A-0 472 487, or in the article of Moffett J. et al., entitled Specifying Discretionary Access Control Policy for Distributed Systems, Computer Communications vol. 13 no. 9 pp. 571-580.

"Sandboxing" techniques allow testing suspicious programs by safely running them in a secure "sandbox" environment without letting the tested program harm the system or its files. Malicious programs, however, may not perform the offensive or expected actions immediately during the test period, either because they detected that they're being tested, or because they're designed to perform their offensive actions randomly or at certain dates, for example. Hence, although a program seems to behave correctly during the test period, it can harm the system once it has passed the test and has been allowed to run for real. Also, positive programs may not behave correctly or may not function at all within a sandbox, as they may need to access files and resources within the system for normal reasons.

U.S. Pat. No. 5,398,196, to Chambers, discloses a method for emulating a program's execution in a virtual process, while searching for viral behavior. The disadvantages of this method are the same as above.

SUMMARY

The invention provides a solution for protecting data and program present on a computer from hostile code. It offers protection at any stage of operation of the computer, and protects the computer from any type of hostile code. Specifically, the invention provides a process for protecting objects in a computer from hostile code, comprising the steps of:
  defining at least two trust groups;
  assigning objects and processes in the computer to one of said trust groups, irrespective of the rights of a user of said computer;
  upon operation of a process over an object or over a second process, comparing a trust group of the process with a trust group of the object or with the trust group of the second process, and
  allowing the operation according to the results of said comparing step.

In an embodiment, a process is assigned, upon it being created, to the trust group assigned to the passive code from which the process is created. One may also provide a step of changing the trust group of the process and/or of the object after said operation. One solution therefor is to assign the process to the trust group of the object or of the second process, when the operation is allowed.

The process may further comprise, upon creation of an object by a process, the step of assigning said created object to the trust group of said process.

In a preferred embodiment, trust groups are hierarchically ordered, and the step of allowing comprises:
  allowing said operation when the trust group of said process is higher in said hierarchy than the trust group of said object or of said second process or equal to the trust group of said object or of said second process, and
  denying said operation when the trust group of said process is lower in said hierarchy than the trust group of said object or of said second process.

One may also provide a step of assigning the process to the trust group of an object or of a second process after the operation is allowed.

There may also be defined at least two types of objects, objects being assigned to one of said types; the step of allowing operation over an object may then be carried out according to the type of said object. One may also define least two types of operations; the step of allowing operation over of a process being then carried out according to the type of said process. One may also define at least two types of operations; the step of allowing operation over an object is then carried out according to the type of said operation. It is further possible to define at least two types of storage methods and assign a trust group to a type of storage method; a storage operation for a process of a trust group may then be carried out according to the storage method assigned to the trust group of said process.

The invention further provides a computer, comprising objects and processes;
  a table of at least two trust groups, objects and processes in the computer being assigned to one of said trust groups irrespective of the rights of a user of said computer;
  a controller accessing said table and allowing an operation of a process over an object or over a second process according to the results of a comparison of the trust group of said process and the trust group of said object or of said second process.

The computer may further comprise a table of types of at least two types of objects, objects in the computer being assigned one type; in this instance, the controller accesses said table for allowing an operation. The table of trust groups is preferably stored in a non-volatile memory, as well as the table of types is stored in a non-volatile memory.

The computer may also comprise a table of rules; the controller then accesses the table of rules for allowing said operation. It is advantageous that the table of rules is stored in a non-volatile memory.

Last, the invention provides a computer network, comprising a server and at least one such computer; the table of trust groups is then stored in said server. It also provides a computer network, comprising a server and at least one such computer, the table of types is then stored in said server. It last comprises a computer network, comprising a server and at least one such computer; the table of rules is then stored in the server.

BRIEF DESCRIPTION OF THE DRAWINGS

Other features and advantages of the invention will appear from the following description, where

FIG. 3 is a flowchart of a process for assigning new objects to a trust group;

FIG. 4 is a schematic view of a computer where the process is embodied;

DETAILED DESCRIPTION

The invention is based on the recognition that the action of hostile programs in spite of the user's will is due to the fact that programs run with the same access privileges as the users who executed them. Thus, any object that is accessible to the user, is also accessible to the programs he runs—and may therefore be accessed by a hostile program in case the user inadvertently or intentionally runs such a program.

The invention thus suggests defining trust groups, and assigning objects in a computer to one of the trust groups. Any operation of a process over an object is then allowed or denied according to the results of the comparison of the trusts groups of the process and of the object upon which the process operates.

The method of the invention is different from all prior art methods discussed above. There is no need to scan files or programs to detect known signatures; the process operates independently from the user. Instead of assigning rights to the user and allowing any action of the user, the invention assigns trust values to the programs and objects in the computer.

Figure 1:
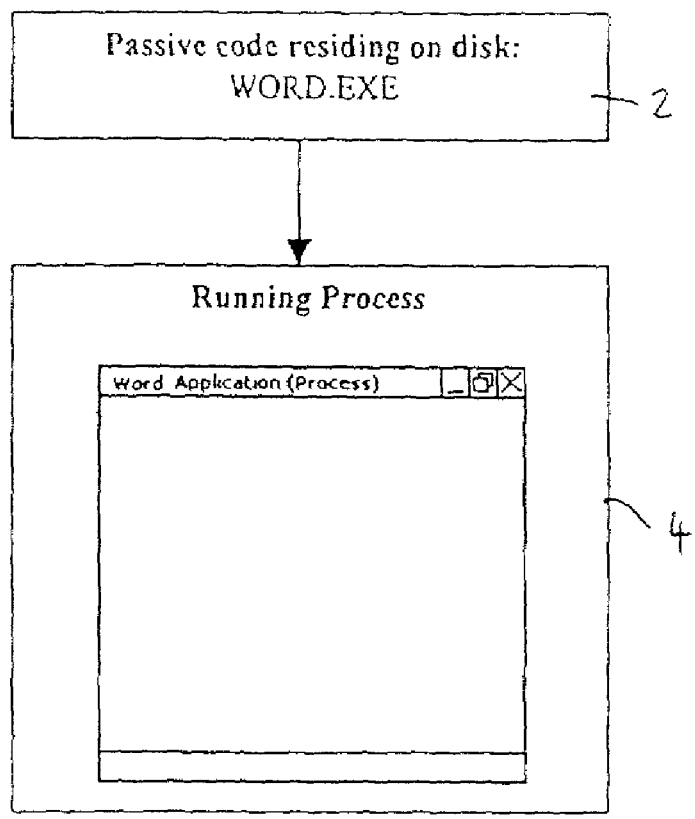
FIG. 1 shows diagrammatically passive code and a process.

In a computer, we call "code" or "program" any set of instructions that can be interpreted or executed by the processor of the computer. When code is passively stored on a storage media without being executed, we call it "passive code." When code is actively running in memory, it is a "process." The mechanism of loading a program from the storage media where it resides as passive code, into memory (e.g. RAM) where it runs as an active process, is called "execution."FIG. 1 illustrates an example of code execution mechanism: here, a file 2 called "WORD.EXE" represents passive code. This file is stored in a storage device of the computer, such as a hard disk. When the computer instructs to execute it, the Operating System (OS) copies an image of this file into memory (RAM) and runs it from there. At this stage, "WORD" is a process 4, since it is now running. Note that although the file "WORD.EXE" and the process "WORD" that is in memory may have similar contents (because one is initially copied from the other), they are two different entities: each can be modified without affecting the other. Additionally, the computer user can execute "WORD.EXE" several times and have several different "WORD" processes running at the same time, but separately. Furthermore, processes can execute passive codes and hence create other processes. If a process A creates a process B, process A is called the "parent process" and process B is called a "child process."

We call an "object" any file, passive code, document, script, macro, process, registry key or other system object that needs to be protected by the present invention, or that contains Code that can be interpreted by the OS (operating system) or any Process. An object containing Code is preferably protected, since it may be executed, and may therefore be used for hostile purposes.

Processes and objects being defined, the process suggest defining trust groups, and assigning objects and processes to one of the trust groups. A trust group is thus a set of processes and objects. The way objects and processes are assigned to the trust groups is discussed below; and it should only be noted that the trust groups are independent of the rights of the user of the computer. In other words, trust groups are different from the rights defined in the prior art.

For the sake of convenience, trust groups may simply be represented by a trust value common to all elements of the group. This value may be represented as a number, or by any other representation. In the simplest instance, two groups are defined. The groups could then be represented by 0 and 1—where one of these values means "trusted" and the other one means "untrusted". As exemplified below, trust values could also be a number from 0 to 10. This may allow up to 11 trust groups to be defined. For determining objects and processes to one of the trust groups, one may use a trust table, representative of the trust group of each process or object assigned to one of the trust groups. There may be provided two tables, for storing separately trust groups for objects and processes. Indeed, it is advantageous that the trust table for the objects be recorded on a non-volatile storage device, e.g. a hard disk or a remote server; on the other hand, since processes are essentially active in RAM only, a trust table for processes may be stored in the RAM.

Objects and processes being thus assigned to trust groups, any operation of a process over an object—e.g. for modifying or deleting an existing object causes the trust group of the process to be compared to the trust group of the object. The operation may then be allowed or not allowed according to the results of the comparing step.

The process disclosed above protects objects in the computer from hostile code. Assume for instance two groups are defined, one containing "trusted" objects and processes, the other one containing "untrusted" objects and processes. As explained below, trusted objects and processes could be considered not hostile, e.g. commercial code and the like. One would allow or not allow an operation of a process upon an object depending on the trust group. For instance, in the simplest embodiment, the only prohibited operations would be the operations of an "untrusted" process over a "trusted" object. This embodiment is crude, and it still makes it possible to restrict the operation of the computer so that there is no risk of hostile code interacting with the computer. Indeed, such code would be assigned to the "untrusted" group—since its origin may not be identified. As compared to the prior art system of rights, this process also protects the computer from actions of the user. Since processes and objects are assigned to the trust groups irrespective of the user, the user may not endanger the computer, even if he has high level rights.

As briefly explained above, one may start by assigning objects to various trust groups. Objects may be assigned to the trust groups according to the confidence given to these objects. For instance, software purchased from a computer vendor would normally be more trusted than software downloaded from unknown Internet Web or FTP sites. Software copied at the installation of a computer may also be considered as trustworthy, and may be assigned to a trust group accordingly. Objects installed later would be assigned to a trust group representative of a lower trust. Assigning objects to trust group may be carried out by a computer supervisor. This supervisor is the person who is in charge of the computer's security. In a networked environment, this is usually the network administrator. In single-user environments, this can be the machine user.

Figure 2:
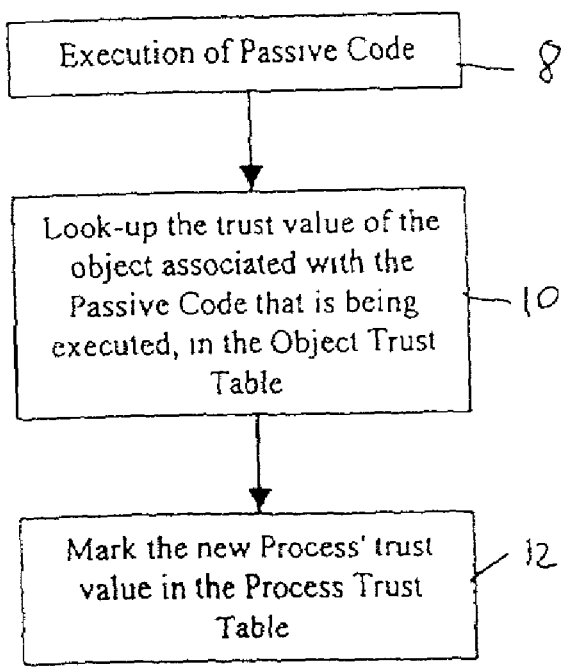
FIG. 2 is a flowchart of a process for assigning processes to a trust group.

The same method may be used for assigning processes to trust group. It is, however, clear that this is likely to be time-consuming and not very effective. FIG. 2 therefore shows a flowchart for assigning processes to a trust group. As discussed above, processes are created from passive code. One solution for assigning a process to a trust group is therefore to assign this process to the trust group assigned to the passive code starting from which the process is created. This is shown in FIG. 2 in the embodiment where trust groups are defined in an object trust table and in a process trust table. In step 8, passive code is executed, thus creating a process in RAM. In step 10, the object trust table is consulted for determining the trust group to which the passive code is assigned. In step 12, the process is assigned to the same trust group. This is marked in the process trust table. The process of FIG. 2 makes it possible to assign simply and rapidly processes to a given trust group.

FIG. 3 shows a flowchart for assigning new objects to a trust group. Briefly, a new object is assigned to the same trust group as the process that created it. In step 20, an existing process, assigned to a given trust group, creates a new object. In the next step 22, the process trust table is consulted for determining the trust group to which the process is assigned. In step 24, the new object is assigned to the same trust group. This is marked in the object trust table. The method of FIG. 3 makes it possible to assign simply and rapidly new objects to a given trust group. It may not be carried out in every instance. Thus, this method could be carried out under normal use of the computer. Another method would be carried out when new objects are installed on the computer. One may also allow the supervisor only to use a method different from the one of FIG. 3 for assigning objects to trust groups. Again, this is different from the prior methods, since the objects are assigned to a trust group, regardless of whoever the user of the computer is. In other words, once an object is assigned to a trust group, this assignment of the object applies for any future user, be it the supervisor or another user.

In one specific embodiment of the invention, one may refine the rules for allowing operations. As discussed above, operation of a process over an object may be allowed on the sole basis of the comparison of the trust groups. One may also define different types of objects, operations or processes. An operation would then be allowed or carried out taking into account the type of object, operation, process or storage method. For objects, one could for instance distinguish between passive code and other objects, and allow different operations according to the type of objects. This allows providing further protection to certain types of objects. For processes, one could distinguish between processes according to user-defined process types. For operations, one could distinguish between opening, reading, creating, modifying or deleting. Again, this makes it possible to makes some operations—e.g. those deemed to be more risky—more difficult to carry out than others. One could also define different storage methods—e.g. using encryption and/or compression—and assign a trust group to a given storage method. In this case, a process in a trust group would use the storage method to which its trust group is assigned. This makes it possible to use various storage methods according to the level of confidence granted to the processes. One could thus protect trusted information—information created by a trusted process—by encrypting it.

So far, the description protects a computer against hostile code. It may however interfere too much with the operation of the computer—it being understood that any protection against hostile code will interfere with the operation of the computer, and will limit the scope of allowed operation. A more flexible example is now described. In this example, trust groups may be changed, for processes and/or for objects, in case an operation is allowed. This makes it possible to broaden the scope of operations, while still protecting the computer. Alternatively, it may improve the protection of the computer. An example is given in the case of two trust groups. The rules for allowing operations could then comprise the following rules:

allow operation of a process assigned to the "trusted" group over an object of this group;

allow operation of a process assigned to the "trusted" group over an object of the "untrusted" group, and assign the process to the "untrusted" group thereafter, with other rules being defined for the other cases. Assume for instance the process is the WORD process discussed above. Assume also that this process is in the "trusted" group. The WORD process may access a trusted object, e.g. a trusted file. When the WORD process accesses some untrusted object, e.g. a new file downloaded from an Internet server, the operation is allowed. However, the process then passes from the trusted group to the untrusted group. This ensures that the process, which may have been corrupted by the untrusted object, will not contaminate objects in the trusted group. The number of possible operations is increased, while still protecting the computer; the protection is also improved.

All features discussed above were discussed separately, for the sake of clarity, one should understand that these features, or some of them only may be combined.

FIG. 4 is a schematic view of a computer where the invention is carried out. The computer 30 comprises non-volatile memory 32, e.g. a hard drive, a floppy disk, or the like. It has a processor 34 with associated RAM 35. The processor 34 is connected and accesses both non-volatile memory 32 and RAM 35. Memory 32 contains a number of objects 36, as well as a table 38 of objects trust groups. There is also provided in memory 32 a table 40 of types for the objects, as well as a table 42 of rules. RAM 34 contains a number of active processes 44, a table 46 of processes trust groups, as well as a table 47 of types of processes. In addition, there is provided in RAM 32 a controller 48 for accessing the tables of trust groups when a process is operating over an object. The controller allows the operation according to the results of a comparison of the trust group of the process and of the trust group of the object. This controller may be designed to work at the OS-level, and may be implemented in a Driver, VxD or TSR, depending on the OS type.

We now provide an example of another embodiment of the invention, where trust groups are hierarchically ordered. Such an order makes it simpler to devise rules for allowing or denying operations, upon comparison of trust groups. Trust groups may then simply be referred to as a trust value associated with the group. The words "trust groups" and "trust value" are used interchangeably in the rest of this specification. The order of the trust groups may for instance be selected as follows: the higher an object's trust value is, the less accessible and more protected it will be, and vice versa. In the example, the trust value is a number from 0 to 10. The objects of a new machine have a high trust value. A computer's trust regresses with time, as new software and files are executed and opened on it. Thus, the computer supervisor will typically set all objects to a high trust value upon installation of a new machine. Any object installed or introduced later into the computer, will have by default a low trust value, unless the supervisor explicitly specifies otherwise (e.g. when installing a new commercial software).

Object Trust Table

Thus, each system's object is initially provided with a supervisor-defined trust value. All of the objects' trust values are recorded in a "Object Trust Table," stored on a storage media such as a hard disk or a database server. Any object that is added to the system will obviously not be listed in the Object Trust Table as it was set initially, and thus all objects that are not stored in the Object Trust Table are automatically considered with a low trust value by default. For example, when the machine is in its original clean state, the supervisor can mark trusted objects with a high trust value. Any objects received from the outside after that moment will automatically be assigned with a low trust value, unless the supervisor specifies otherwise.

Process Trust Table

Processes, just like objects, are assigned with trust values. As discussed above, Process trust also regresses with time. Indeed, trusted processes that load or interpret code can be manipulated into performing malicious actions themselves. For example, a Process that is initially in a trusted state can become hostile in its turn if it opens a file with macros that instruct it to spy or destroy data. Processes trust values will be stored in a second table called "Process Trust Table." This table is stored in a storage media such as RAM (Random Access Memory), and can be emptied every time the OS loads-up or restarts, since at that point there are no Processes running. When a Process is created during the phase of execution, it obtains the same trust value as the Passive Code from which it was loaded. For example, if the Passive Code "WORD.EXE" was marked with a trust value of 10, then whenever WORD.EXE is executed, the resulting new Process "WORD" will be initialized with a trust value of 10, too. FIG. 2 shows how a Process obtains a trust value that depends on the object from which it was loaded.

Creation/Modification of an Object

As explained above in reference to FIG. 3, when a Process creates a new object, this object obtains the same trust attributes as that Process. When a process modifies the contents of an existing object—upon which it is allowed to operate—the object's trust group is amended to the trust group of the process. This makes it possible to take into consideration possible contamination of an object by a process.

Interaction between Processes and objects

Figure 5:
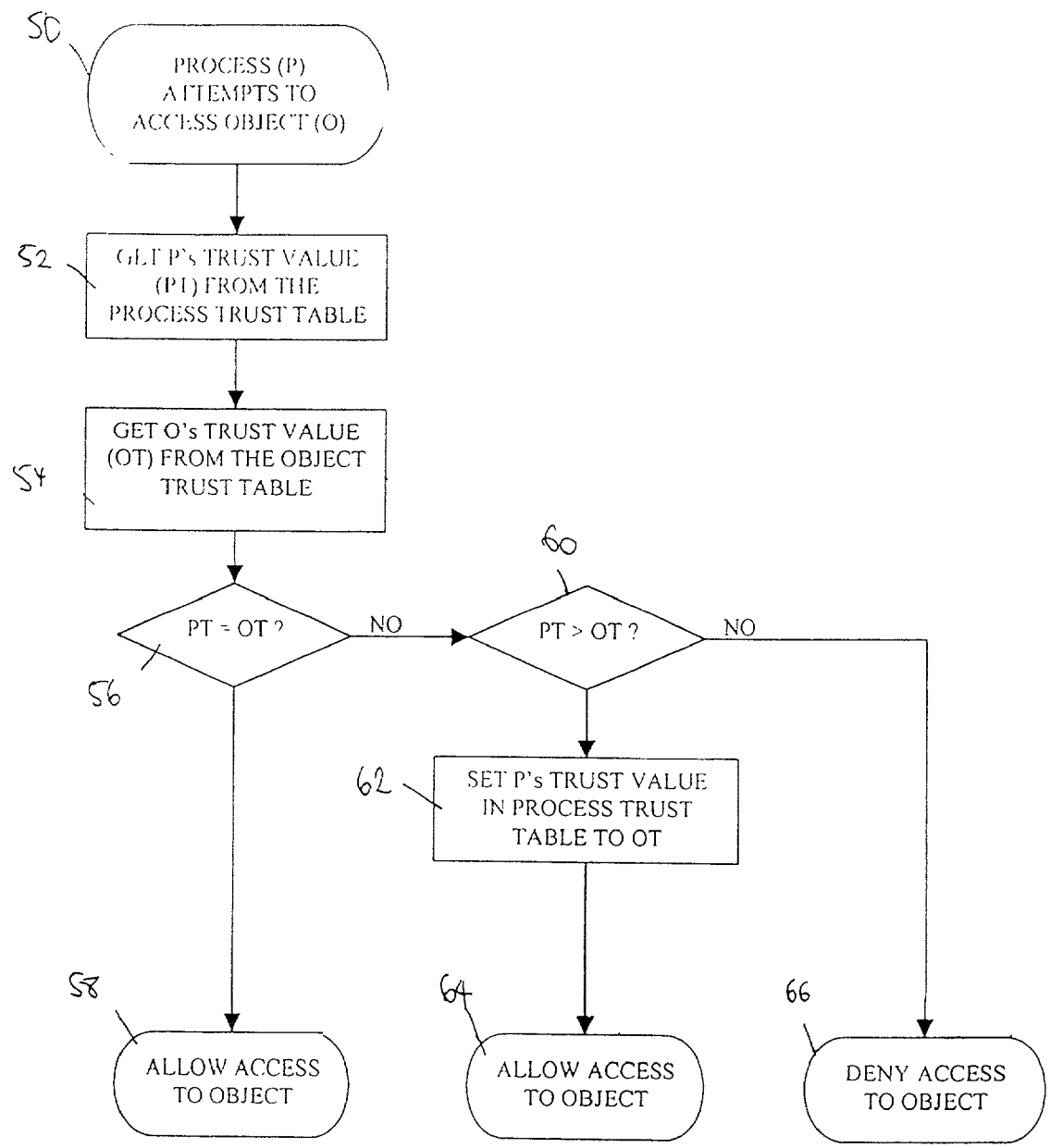
FIG. 5 is a flowchart of a process according to the invention.

FIG. 5 shows a flowchart of the process in the present example. Processes can access objects having the same trust value as themselves. In other words, a Process whose trust value is 5 can access an object whose trust value is 5. However, Processes cannot access objects having trust values higher than themselves. For example, a Process whose trust value is 5 cannot access an object whose trust value is 10.

When a Trusted Process accesses an object with a lower trust value, the trust value of this Process itself is immediately changed in the Process Trust Table and becomes as low as the accessed object's, and this remains until the Process is terminated. That way, the next time this Process attempts to access an object, it will be less privileged than before it accessed the untrusted object. For example, a Process with a trust value of 10 is allowed to access objects whose trust value is 10. But if it opens an object whose trust value is 9, the Process' trust value will be lowered to 9 and from that point on it will not be allowed to access objects with trust values higher than 9, and this until the process is terminated or restarted. This takes into consideration the fact that a process accessing an object may be contaminated by the object. Lowering the trust value of the process avoids trusted objects from being contaminated.

FIG. 5 illustrates the way interaction is done between Processes and objects. In step 50, a Process (P) attempts to access an object (R). In step 52, we look-up through the Process Trust Table, looking for the entry matching Process P. We store the result in PT. In step 54, we look-up through the Object Trust Table, looking for the entry matching object R. We store the result in RT. In step 56, PT is compared with RT. If both trust values are equal, access is allowed in step 58. Back to step 56, if PT and RT were not equal, we test in step 60 if the Process' trust value is higher than the object's. If this is the case, in step 62, the entry for the Process in the Process Trust Table is set to RT and we proceed to step 64 where access to the object is allowed. Note that the next time Process P attempts to access an object, it will go through the same decision-making except that its trust value will be different, as it was changed in step 62. Going back to step 60, if the Process' trust value is lower than the object's, then we proceed to step 66 where access to the object is denied.

SPECIFIC EXAMPLE OF THE INVENTION

The following tables provide specific examples of the process in different scenarios.

TABLE 1

| Order | Actions Performed by the System | Operations performed by the controller | Process trust value |
|---|---|---|---|
| 1 | Execution of WORD.EXE whose trust value is 10. | Mark the newly-created Process with the same trust value as WORD.EXE: 10 | 10 |
| 2 | WORD Process opens object INFO.DOC whose trust value is 10. | Allow | 10 |
| 3 | WORD Process creates a new object: NEWFILE.DOC | Mark the newly-created object with the same trust value as the Process': 10. | 10 |
| 4 | WORD Process opens object MACRO.DOC, whose trust value is 5. | Change WORD Process' trust value in the Process Trust Table to 5 and Allow access to the object. | 5 |
| 5 | WORD Process attempts to open object INFO.DOC, whose trust value is 10. | Deny access to the object. | 5 |
| 6 | WORD Process creates a new object: NEWFILE2.DOC. | Mark the newly-created object with the same trust value as the Process': 5. | 5 |

The example of Table 1 shows rules for allowing the operation of the process over the object, as discussed in reference to FIG. 5.

TABLE 2

| Order | Actions Performed by the System | Operations performed by the Invention | Process trust value |
|---|---|---|---|
| 1 | Execution of an object whose trust value is 1: VIRUS.EXE | Mark the newly-created Process with the same trust value as VIRUS.EXE: 1 | 1 |
| 2 | VIRUS Process attempts to access object C:\WINDOWS.EXE, whose trust value is 10. | Deny access to the object. | 1 |
| 3 | VIRUS Process creates a new object: PAYLOAD.EXE | Mark the newly-created object with the same trust value as the Process': 1. | 1 |

The example of Table 2 evidences that a low trust process or object may not contaminate of harm a process having a higher trust value. In the example of a virus, the virus cannot propagate through the Windows object.

Thus, with the method presented so far we have secured the computer, while still allowing a number of operations. We now describe another embodiment variant of this method, which is more flexible and faster.

Trust Groups

In addition to providing each object with a trust value, e.g. by defining trust groups, additional information and behavior is defined for objects and processes in the groups. Each object and process is linked to a "Trust Group," using a Trust Group identifier. The following table is an example of Process Trust Table where each process, identified by an OS-provided process ID (PID), is linked to a Trust Group with a Trust Group identifier.

TABLE 3

| SYSTEM-DEFINED PID | 100 | 110 | 120 | 130 | 140 |
|---|---|---|---|---|---|
| TRUST GROUP ID | 1 | 1 | 2 | 1 | 3 |

Trust Group definitions may be recorded in a central table called "Trust Groups Table," recorded on a central storage media (e.g. file server, hard-drive or non-volatile memory). Each Trust Group may have a data structure shown in the following table.

TABLE 4

| Trust Group (TG) |
|---|
| ID: Trust Group Id
TV: trust value
FromLower: Rules list
ToLower: Rules list |

ID is an index value, recorded in the Object Trust Table and the Process Trust Table, which identifies the Trust Group to which objects and Processes belong. TV is the group's trust value. FromLower is a list of rules to be applied when requests are made by processes whose Trust Group's trust value is lower than TV, targeted at objects belonging to TG. ToLower is a list of rules to be applied when a process belonging to group TG is making requests on objects whose trust values are lower than TV. The following tables are an example of Trust Group definitions, with three different trust groups.

TABLE 5

| Trust Group 1 |
|---|
| ID: 1
TV: 8
FromLower rules:
A
ToLower rules: B |

TABLE 6

| Trust Group 2 |
|---|
| ID: 2
TV: 5
FromLower rules: C
ToLower rules: D |

TABLE 7

| Trust Group 3 |
|---|
| ID: 3
TV: 10
FromLower rules: E
ToLower rules: F |

A "rules list" links several rule nodes together. Each rule node is formed as shown in Table 8.

TABLE 8

| Rule (R) |
|---|
| OP: Operations
OT: Target object types
A: Action to perform |

OP indicates what kind of I/O operations this rule applies for. For example, OP can be: Open, Read, or Write. OT is the type of objects for which this rule applies. It can be, for example: executable files, document files and registry keys. Objects can also be applied to functions that need to be limited to Processes with certain trust groups. For example, indicating "networking API" as an object type forbids use of networking operations to untrusted Processes. A is the action to perform when OP and OT match a request. It can be for example: "Deny," "Allow," "Set requesting process' trust to target object's" and/or "Set target object's trust to process." These last two actions allow for dynamically changing a process or an object's trust groups, according to its interaction with other processes and objects. Table 9 shows an example of several rules lists.

TABLE 9

|  | Rules A | Rules B | Rules C | Rules D | Rules E | Rules F |
|---|---|---|---|---|---|---|
|  | Rule #1 | Rule #1 | Rule #1 | Rule #1 | Rule #1 | Rule #1 |
| OP: | Read, Write | Read | Open | Open | Write | Open |
| OT: | Registry keys | Documents | Registry keys | Image files | Any file | Text files |
| A: | Deny | Deny | Deny | Allow | Deny | Allow |
|  | Rule #2 | Rule #2 | Rule #2 | Rule #2 | Rule #2 | Rule #2 |
| OP: | Open | Open | Read | Open | Read | Open |
| OT: | Images | Executables | Executables | Any file | Documents | Any file |
| A: | Deny | Deny | Allow | Deny | Deny | Deny |
|  | . . . | . . . | . . . | . . . | . . . | . . . |

Figure 6:
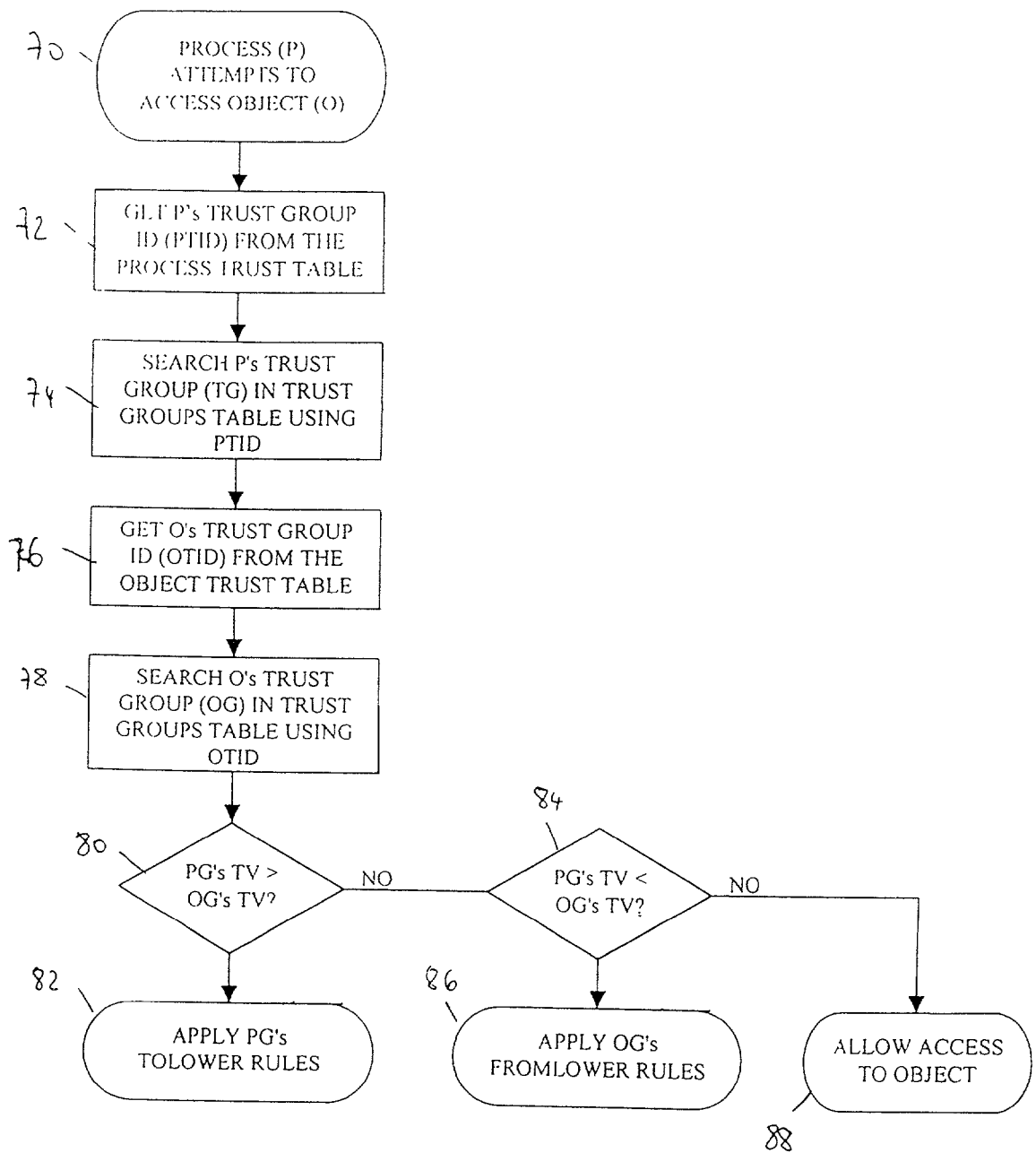
FIG. 6 is a flowchart of an operation of a process over an object.

Let us now see how this new implementation works. FIG. 6 illustrates a flowchart in which a process (P) attempts to access an object (O), as shown in step 70. In step 72, we look-up through the Process Trust Table, looking for the entry matching Process P. On most operating systems, the process can be identified by its process ID (PID). The Trust Group ID associated with the process is stored in PTID. In step 74, we look-up through the Trust Groups Table, looking for the trust group whose ID matches PTID. In steps 76 and 78, we repeat the same operations for the object that the process is attempting to access. In step 76 we look for the object's Trust Group ID within the Object Trust Table and store it in OTID. In step 78 we look-up the Trust Groups Table for the Trust Group whose ID matches OTID. In step 80, we compare the trust value fields of the process' Trust Group to that of the object's Trust Group. If the process' trust group has a higher trust value, we proceed to step 82, where we apply the rules from the process' trust group ToLower field. Back to step 80, if the process' trust group did not have a higher trust value than the object's, we proceed to step 84, where we test if the process' trust group has a lower trust value. If that is the case, we proceed to step 86, where we apply the rules from the target object's FromLower field. Back to step 84, if the process' trust group and the object's trust group had equal trust value fields, then access is allowed to the object in step 88.

Figures 7, 10:
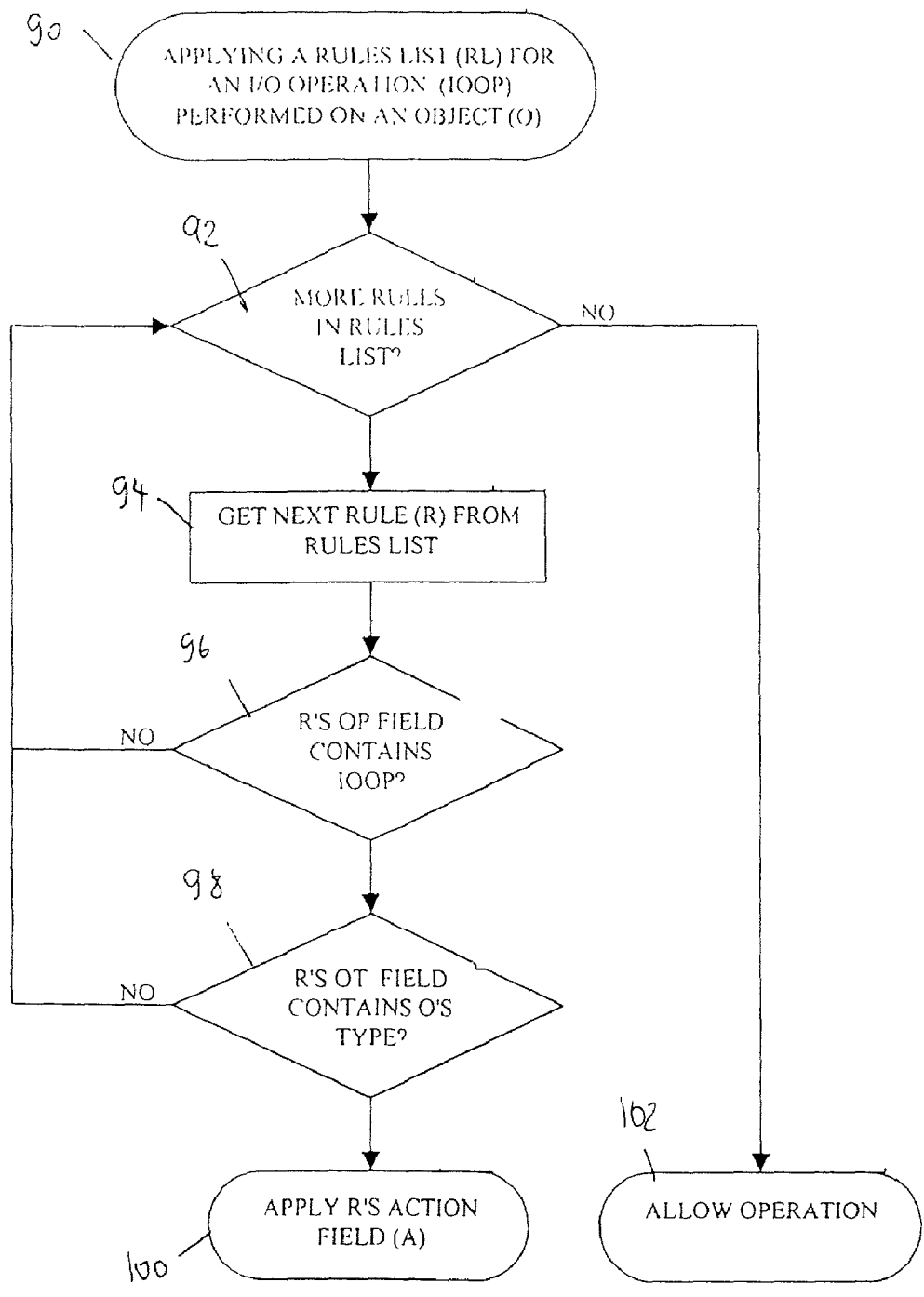
FIG. 7 is a flowchart of the application of a rule.

FIG. 7 shows how a rule is applied from a trust group's rules list field. In step 90, we refer to the rules list that needs to be applied. In IOOP, we have the operation that is requested on the target object (O). Steps 92 to 98 are executed in a loop, for each rule node in the rules list. In step 96, we test if the current rule's OP field contains the requested operation IOOP. Such test can be done using a bit combination for example, where each possible operation is represented by a bit, and the whole number represents the total set of operations. If the test is not positive, we proceed to the next rule in step 92. Similarly, in step 98 we test if the current rule's OT field contains the type of object O. The object's type can be for example: executable file, document file, registry key etc. If this is not the case, we proceed to the next rule in step 92. If both conditions were true, the process is finished in step 100, where the action to be applied is obtained from the rule node's Action field. If no rule was found that matches the required conditions, the process is finished in step 102, where the operation is by default allowed.

To enhance flexibility further, rule nodes can also have a "rules priority" field. This allows resolving tests between two different trust groups having the same trust values: the group whose rules priority is higher, will be obeyed to. This can also help with special cases where the rules of the trust group with the lowest trust value needs to be applied instead of that of the trust group with the highest trust value, as was shown in FIG. 7.

Hence, it is now possible to establish a secure environment in which several Trust Groups protect different objects with different security attributes. The invention is designed to work at the OS-level, filtering I/O operations. This is usually implemented in a Driver, VxD or TSR, depending on the OS type.

The examples given above may be changed. Trust Groups can be pre-defined and/or configurable. The process may apply to I/O operations as well as API function calls or any program-triggered action that may endanger the system.

What is claimed is:

1. A process for protecting a computer from hostile code, the process comprising:
    defining at least two trust groups, each of the defined trust groups being characterized by a trust group values, a FromLower rules list pointer, and a ToLower rules list pointer;
    assigning objects and processes in the computer to one of said trust groups, irrespective of the rights of a user of said computer;
    defining at least two object types;
    defining a plurality of operation types;
    assigning an object type to each of the objects;
    defining a plurality of action rules, each of the action rules corresponding to at least one of the FromLower or ToLower rules list pointers, each of the action rules listing a combination of an operation type from the plurality of operation types; an action; and object type; and,
    upon an access request of an operation type by a request process to a target object, comparing the trust group value of the trust group of the process to the trust group value of the trust group of the object and:
        when the trust group value of the trust group of the process is higher than the trust group value of the trust group of the object, inspecting all action rules corresponding to the ToLower action rules list pointer of the trust group of the process to obtain a matching action rule listing the same operation type of the access request and the same object type of the target object and, once a matching action rule is obtained, performing the action indicated by the matching action rule; and
        when the trust group value of the trust group of the process is smaller than the trust group value of the trust group of the object, inspecting all action rules corresponding to the FromLower action rules list pointer of the trust group of the object to obtain a matching action rule listing the same operation type of the access request and the same object type of the target object and once a matching action rule is obtained performing the action indicated by the matching action rule.

2. The process of claim 1 wherein a process is assigned upon creation to the trust group assigned to the passive code from which the process is created.

3. The process of claim 1 further comprising changing the trust group of the process if the trust group value of the process is greater than the trust group value of the object.

4. The process of claim 1, further comprising changing the trust group of said object after performing said action.

5. The process of claim 1 further comprising, upon creation of an object by a process, assigning said created object to the trust group of said process.

6. The process of claim 1, wherein the object types comprise executable file, document file, and registry key.

7. The process of claim 3 further comprising assigning said process to the trust group of said object if the trust group of said process is higher than the trust group of said object.

8. The process of claim 3, wherein upon a restart of said process, the trust group of said process reverts to the original trust group of the object from which the process was created.

9. The process of claim 1, wherein each of the action rules further lists a rule priority.

10. The process of claim 1, wherein said object types comprise passive code and executable code.

11. The process of claim 1, wherein said operation types comprise open, read, create, modify, and delete.

12. A computer-readable medium comprising computer readable instructions for protecting a computer from hostile code, the instructions causing the computer to:
define a plurality of trust group values;
define a first and a second rule sets, each of said rule sets comprising a plurality of rules defining an action based on an operation type;
identify objects and processes within the computer;
define a table of at least two trust groups, wherein each trust group comprise one trust group value and said first and second rule sets; and
assign objects and processes in the computer to one of said trust groups irrespective of the rights of a user of said computer;
whereby upon operation of a process over an object, the computer is configured to:
compare a trust group value of the process with a trust group value of the object;
determine whether to allow the operation by following the rules of said first rule set if the trust group value of the process is not smaller than the trust group of the object and
following the rules of said second rule set if the trust group value of the process is smaller than the trust group value of the object.

13. The computer-readable medium of claim 12 further comprising instructions causing the computer to:
define a table of types of at least two types of objects, the objects in the computer being assigned one type; and
wherein said plurality of rules define said actions further based on the type of said object.

14. The computer-readable medium of claim 12, wherein said operation type comprises open, read, create, modify, and delete.

15. The computer-readable medium of claim 13, wherein said types of objects comprise passive code and executable code.

16. The computer-readable medium of claim 12, wherein the computer is operatively coupled to a network, the network including a server, the table of trust groups stored in said server.

17. A computer-readable medium according to claim 12, wherein the computer is operatively coupled to a network, the network including a server, the table of rules is stored in said server.

18. A computer comprising:
a random access memory (RAM);
a non-volatile memory;
a processor coupled to said RAM and said non-volatile memory;
wherein said non-volatile memory comprises:
a list of object types;
a list of rules each of said rules defining an action based on an object type and operation type;
a list of object trust groups, each trust group defining an object trust value and coupled to at least one of said rules;
a plurality of objects, each of said objects having an object type and assigned to one of said trust groups;
wherein upon start of the computer a process trust list is initiated in said RAM;
and wherein when a process is created in said RAM from an originating object of one of said objects, said processor assigns to said process a process trust value equal to the object trust value of said originating object and enters the process trust value in said process trust list.

19. The computer of claim 18, further comprising a controller receiving operation requests from said process to be performed on a target object of one of said objects and, upon receiving said requests said controller access said list of object trust groups, list of rules, and list of object type to determine whether to allow the operation.

20. The computer of claim 19, wherein when the controller allows the operation request but the process trust value is lower than the target object trust value, said processor resets the process trust value equal to that of the target object trust value.

* * * * *